US007496417B2

(12) United States Patent
Lee et al.

(10) Patent No.: US 7,496,417 B2
(45) Date of Patent: Feb. 24, 2009

(54) AUDIO PROCESSING SYSTEM FOR USE IN MULTI-CHANNEL AUDIO CHIP

(75) Inventors: Chao-Cheng Lee, Science-Based Industrial Park (TW); Jui-Cheng Huang, Hsin Chu (TW)

(73) Assignee: Realtek Semiconductor Corp., Hsin Chu (TW)

( * ) Notice: Subject to any disclaimer, the term of this patent is extended or adjusted under 35 U.S.C. 154(b) by 1098 days.

(21) Appl. No.: 10/734,257

(22) Filed: Dec. 15, 2003

(65) Prior Publication Data

US 2004/0128008 A1 Jul. 1, 2004

(30) Foreign Application Priority Data

Dec. 27, 2002 (TW) ............................. 91137803 A

(51) Int. Cl.
*G06F 17/00* (2006.01)

(52) U.S. Cl. ........................................................ 700/94

(58) Field of Classification Search .................. 700/94; 381/300, 27, 307; 341/20-35, 173-192
See application file for complete search history.

(56) References Cited

U.S. PATENT DOCUMENTS 4,977,446 A * 12/1990 Shiomi et al. ............... 348/747
5,059,872 A * 10/1991 Matsumi et al. ........ 315/368.12

* cited by examiner

*Primary Examiner*—Curtis Kuntz
*Assistant Examiner*—Andrew C Flanders
(74) *Attorney, Agent, or Firm*—Muncy, Geissler, Olds & Lowe PLLC

(57) ABSTRACT

An audio processing system for used in a multi-channel audio chip includes a multiplexer, a digital-to-analog converter, a de-multiplexer, a controller and N sample-and-hold circuits. The multiplexer receives N digital signals and outputs the digital signals one by one in a time-division manner. The digital-to-analog converter receives the digital signals from the multiplexer and converts them into corresponding N analog signals. The de-multiplexer outputs the analog signals one by one in a time-division manner. The controller generates control signals to control the selection of the multiplexer and the de-multiplexer. The sample-and-hold circuits hold the analog signals for a predetermined period of time and then outputs the signals, respectively.

9 Claims, 4 Drawing Sheets

AUDIO PROCESSING SYSTEM FOR USE IN MULTI-CHANNEL AUDIO CHIP

This Nonprovisional application claims priority under 35 U.S.C. § 119(a) on Patent Application No. 091137803 filed in TAIWAN on Dec. 27, 2002, the entire contents of which are hereby incorporated by reference.

BACKGROUND OF THE INVENTION

1. Field of the Invention

The invention relates to an audio processing system, and more particularly to an audio processing system for used in a multi-channel audio chip.

2. Description of the Related Art

The audio technology is advanced from the single-channel to the dual-channel, four-channel, and six-channel (5.1 channels on the DVD player) audio output system. Meanwhile, the audio storage medium has advanced from the analog storage medium, such as a platter, an audiotape and the like, to the digital storage medium, such as CD, DVD and the like.

In order to achieve the multi-channel audio outputs, an audio chip is used to convert the audio signals stored in a digital format in the digital storage medium into multi-channel audio analog signals. The audio chip typically includes a plurality of digital-to-analog converters to convert the digital audio signals into analog audio signals, which are outputted to the speakers to provide sound and/or music for human being.

FIG. 1 is a schematic illustration showing a conventional audio processing system for used in a multi-channel audio chip. As shown in FIG. 1, six digital signals DS1 to DS6 from six channels CH1 to CH6 are inputted to the corresponding digital-to-analog converters (DACs) 111 to 116. The DACs 111 to 116 respectively convert the digital signals DS1 to DS6 into corresponding analog signals AS1 to AS6. The speakers 121 to 126 are connected to the corresponding DACs 111 to 116, respectively, to provide the audio outputs according to the analog signals AS1 to AS6 from the DACs 111 to 116. Thus, the multi-channel audio outputs may be constructed.

In the conventional architecture, a plurality of DACs are needed and the number of DACs is increased with the increasing of the channel number. However, the configuration of DAC is complicated and the size of the circuit is large. Consequently, the cost of the multi-channel audio chip cannot be reduced when the conventional architecture is utilized.

SUMMARY OF THE INVENTION

It is therefore an object of the invention to provide an audio chip with low-cost and with reduced number of DAC.

The invention achieves the above-mentioned object by providing an audio processing system for used in a multi-channel audio chip. The audio processing system includes a multiplexer, a digital-to-analog converter, a de-multiplexer and N sample-and-hold circuits. The multiplexer receives N digital signals (N is a positive integer greater than or equal to 2) and outputs the N digital signals one by one in a time-division manner according to a first control signal. The digital-to-analog converter receives the digital signals from the multiplexer and converts them into analog signals. The de-multiplexer receives the analog signals output from the digital-to-analog converter, and separates the received analog signals into N channel analog signals for output according to a second control signal. The N sample-and-hold circuits sample the N channel analog signals output from the de-multiplexer and hold them for a predetermined period of time, respectively.

In the above-mentioned audio processing system, the sampling time of each of the sample-and-hold circuits may be controlled by the second control signal. The audio processing system may further include a controller for generating the first control signal and the second control signal.

According to the system mentioned above, the cost of the multi-channel audio chip may be effectively reduced.

DETAILED DESCRIPTION OF THE INVENTION

The audio processing system for used in a multi-channel audio chip according to the preferred embodiments of the invention will be described with reference to the accompanying drawings.

Figure 1:
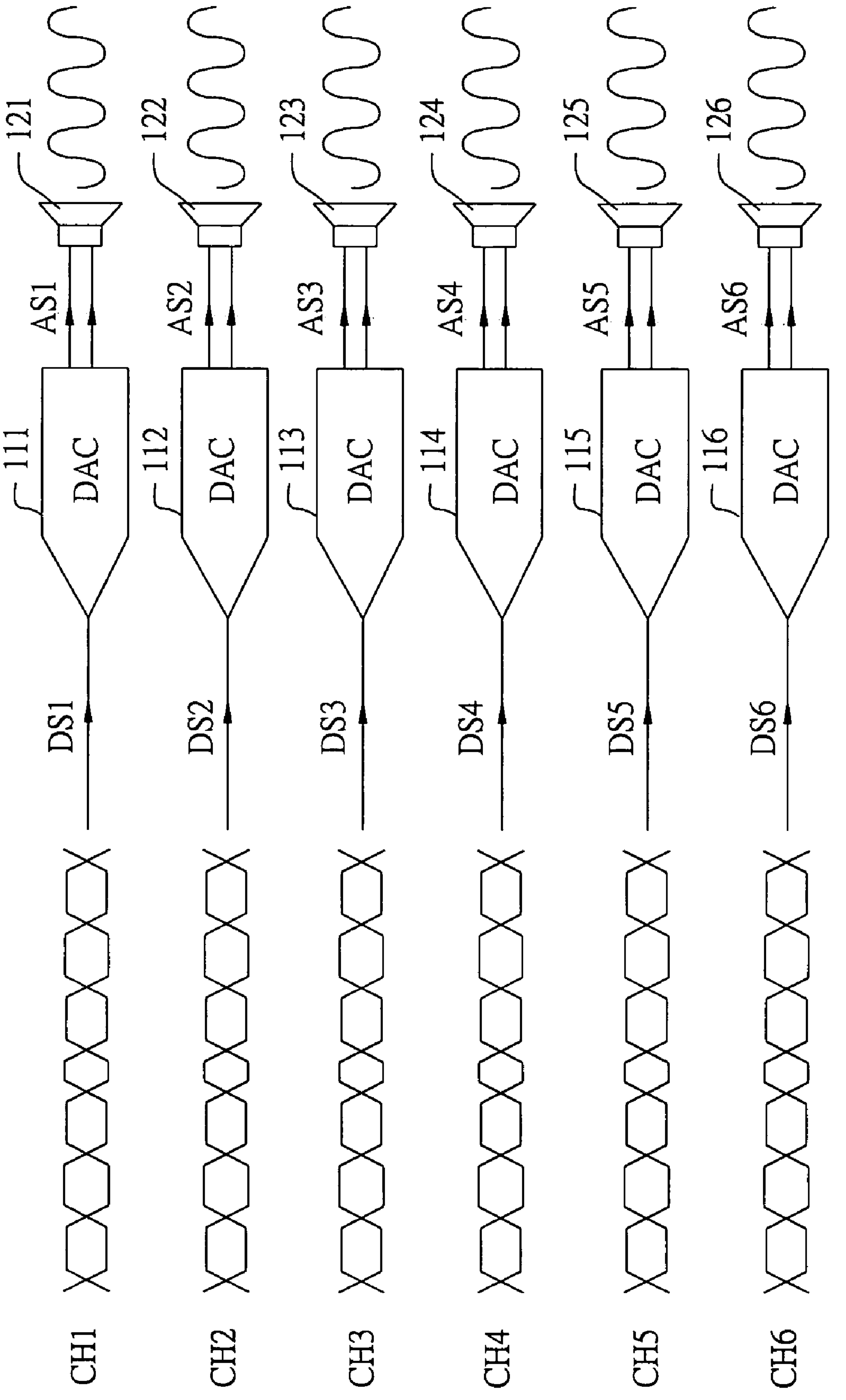
FIG. 1 (Prior Art)
FIG. 1 is a schematic illustration showing a conventional audio processing system for used in a multi-channel audio chip.
Figure 2:
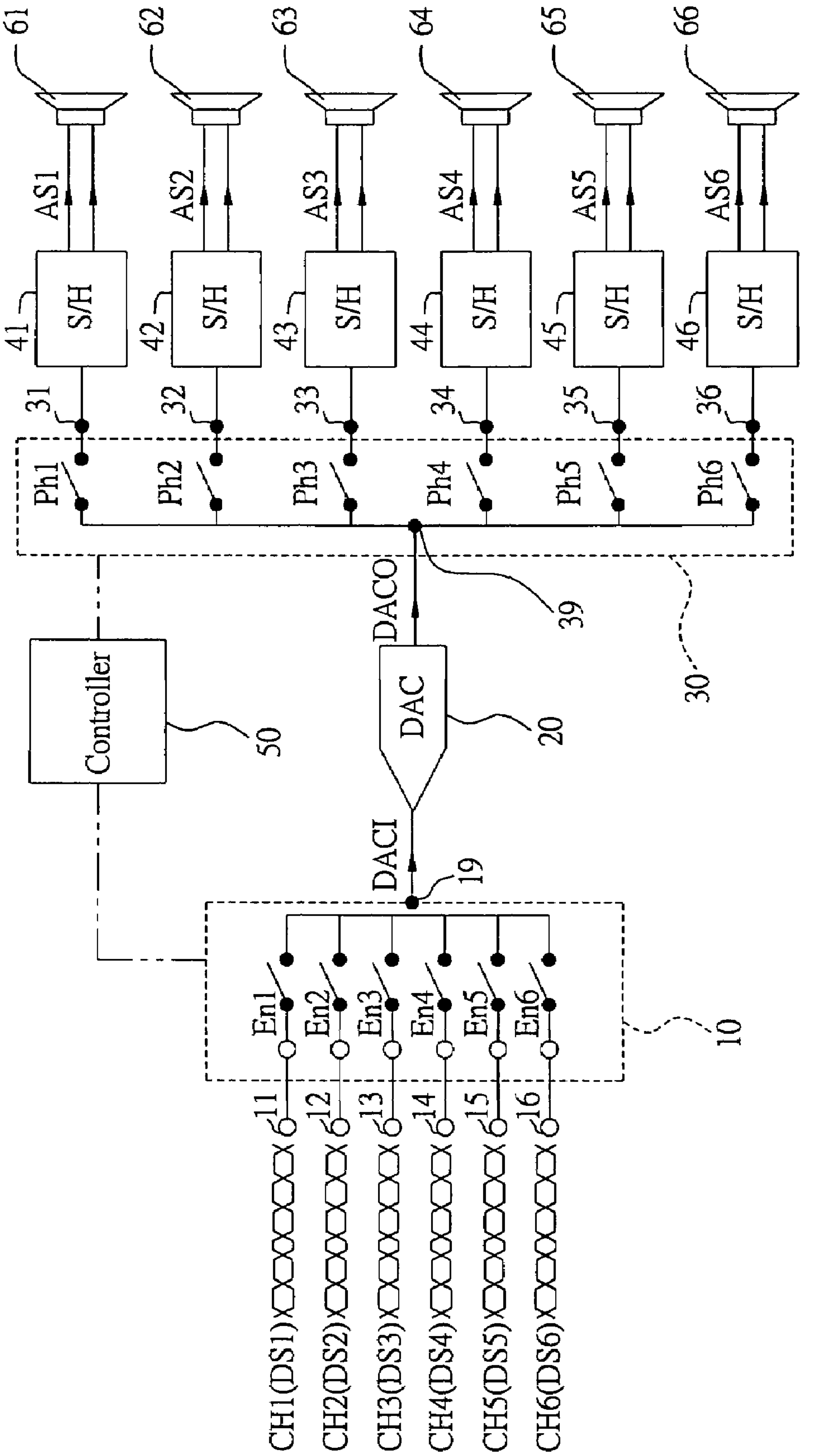
FIG. 2 is a schematic illustration showing an audio processing system for used in a multi-channel audio chip according to the first embodiment of the invention.

FIG. 2 is a schematic illustration showing an audio processing system for used in a multi-channel audio chip according to the first embodiment of the invention. Referring to FIG. 2, the audio processing system includes a multiplexer 10, a digital-to-analog converter (DAC) 20, a de-multiplexer 30, six sample-and-hold (S/H) circuits 41 to 46, and a controller 50. The audio processing system is for receiving and processing digital signals DS1 to DS6 outputted from six channels CH1 to CH6, and then outputting multi-channel audio sounds for human being via six speakers 61 to 66.

The multiplexer 10 includes six digital signal input terminals 11 to 16 and a digital signal output terminal 19, wherein the operation of the multiplexer 10 is controlled by the first control signals En1 to En6. The DAC 20 is coupled to the multiplexer 10 to receive a digital signal DACI and convert it into a corresponding analog signal DACO for output. The de-multiplexer 30 coupled to the DAC 20 includes six analog signal output terminals 31 to 36 and an analog signal input terminal 39 coupled to the DAC 20, wherein the operation of the de-multiplexer 30 is controlled by the second control signals Ph1 to Ph6. That is, the de-multiplexer 30 receives the analog signal DACO outputted from the DAC 20 and selectively outputs the analog signal DACO to one of six analog signal output terminals 31 to 36. The sample-and-hold (S/H) circuits 41 to 46 are for providing the analog signals AS1 to AS6 for the corresponding speakers 61 to 66 for output.

In this embodiment, the controller 50 generates the first control signals En1 to En6, the second control signals Ph1 to Ph6, and sample/hold control signals to control the operations of the multiplexer 10, the de-multiplexer 30, and the S/H circuits 41 to 46, respectively. The sample/hold control signals control the sampling and the holding time of the S/H circuits 41 to 46, respectively. In this embodiment, the second control signals Ph1 to Ph6 also may be utilized as the sample/hold control signals to control the S/H circuits 41 to 46.

Figure 3:
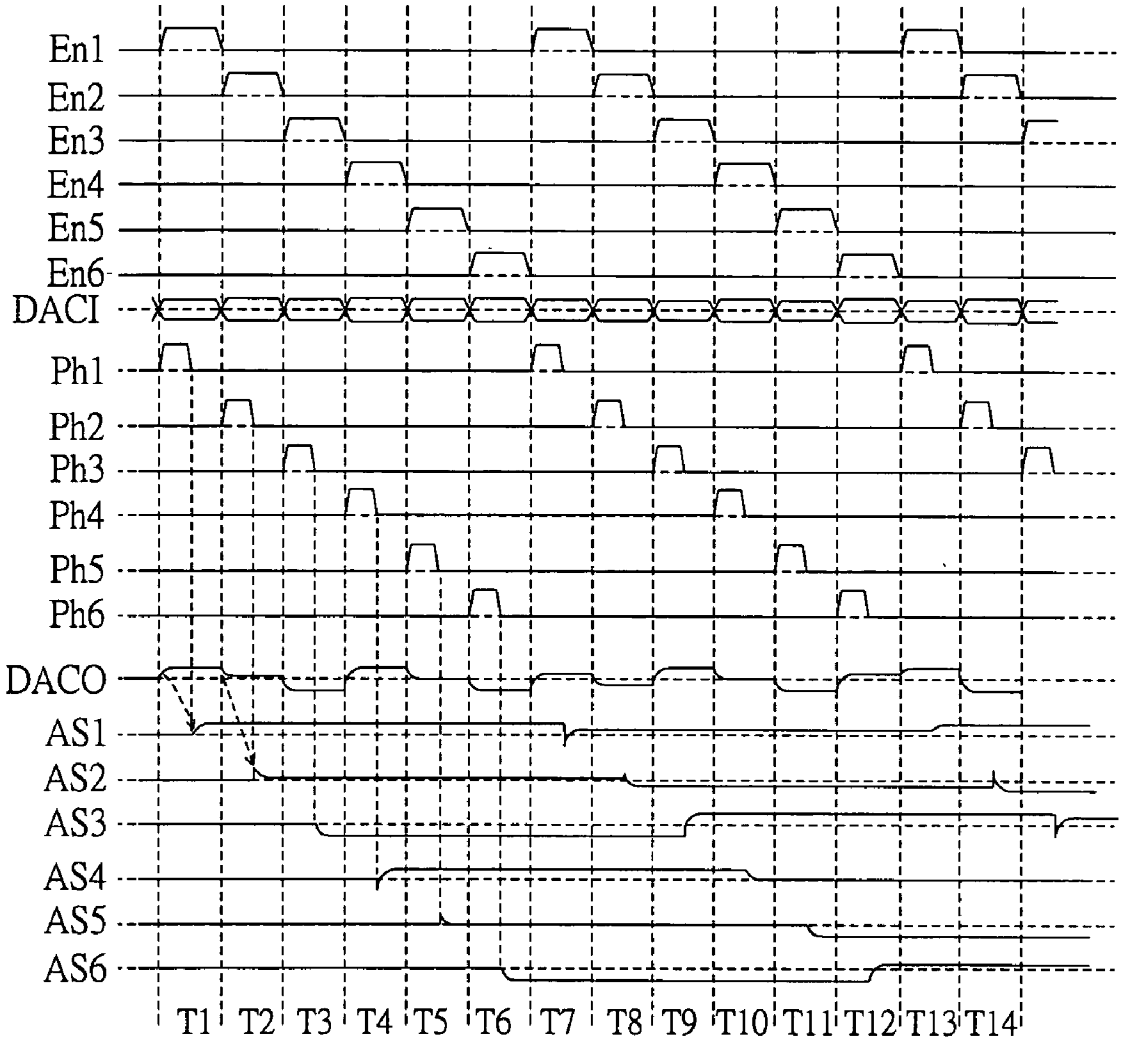
FIG. 3 shows a timing diagram for controlling the audio processing system according to the first embodiment of the invention.

FIG. 3 shows a timing diagram for controlling the audio processing system according to the first embodiment of the invention. The operation of the audio processing system of the first embodiment of the invention will be described with reference to FIGS. 3 and 2.

In the time interval T1, the first control signal En1 is high and the digital signal DS1 is outputted from the multiplexer 10 as the digital input signal DACI of the DAC 20. The DAC 20 is for converting the digital signal DACI into the analog signal DACO and then outputting the analog signal DACO to the de-multiplexer 30. The second control signal Ph1 is kept at HIGH at the first half of the time interval T1 such that the analog signal DACO is transferred to the S/H circuit 41. The second control signal Ph1 becomes LOW at the second half of the time interval T1 through the controlling of the controller 50 while the first control signal En1 is kept at HIGH, so as to prevent the S/H circuit 41 from acquiring the analog signal DACO from other channels. The second control signal Ph1 also controls the sampling and holding operations of the S/H circuit 41. The sampling operation is performed when the second control signal Ph1 is HIGH, and the holding operation is performed when the second control signal Ph1 is LOW. The S/H circuit 41 outputs the analog signal AS1 to the speaker 61 under the control of the second control signal Ph1. Thus, the speaker 61 outputs the audio sound through amplifying the analog signal AS1.

In the time interval T2, the first control signal En2 is HIGH, and the second control signal Ph2 is kept at HIGH at the first half of the time interval T2. Similarly, the S/H circuit 42 outputs the analog signal AS2 to the speaker 62 under the control of the second control signal Ph2. The S/H circuit 41 also continues holding the level of the analog signal AS1.

In the time interval T3, the first control signal En3 is HIGH, and the second control signal Ph3 is kept at HIGH at the previous half of the time interval T3. Similarly, the S/H circuit 43 outputs the analog signal AS3 to the speaker 63 under the control of the second control signal Ph3. The S/H circuits 41 and 42 also hold the levels of the analog signals AS1 and AS2, respectively.

In the time interval T4, the first control signal En4 is HIGH, and the second control signal Ph4 is kept at HIGH at the previous half of the time interval T4. Similarly, the S/H circuit 44 outputs the analog signal AS4 to the speaker 64 under the control of the second control signal Ph4. The S/H circuits 41 to 43 also hold the levels of the analog signals AS1 to AS3, respectively.

In the time interval T5, the first control signal En5 is HIGH, and the second control signal Ph5 is kept at HIGH at the previous half of the time interval T5. Similarly, the S/H circuit 45 outputs the analog signal AS5 to the speaker 65 under the control of the second control signal Ph5. The S/H circuits 41 to 44 also hold the levels of the analog signals AS1 to AS4, respectively.

In the time interval T6, the first control signal En6 is HIGH, and the second control signal Ph6 is kept at HIGH at the previous half of the time interval T6. Similarly, the S/H circuit 46 outputs the analog signal AS6 to the speaker 66 under the control of the second control signal Ph6. The S/H circuits 41 to 45 also hold the levels of the analog signals AS1 to AS5, respectively.

In the time interval T7, the first control signal En1 is HIGH, and the second control signal Ph1 is kept at HIGH at the previous half of the time interval T7. Similarly, the S/H circuit 41 outputs the analog signal AS1 to the speaker 61 under the control of the second control signal Ph1. The S/H circuits 42 to 46 also hold the levels of the analog signals AS2 to AS6, respectively.

Since the period from time interval T1 to time interval T6 constitutes a cycle, descriptions regarding the operations after the time interval T7 will be omitted.

Figure 4:
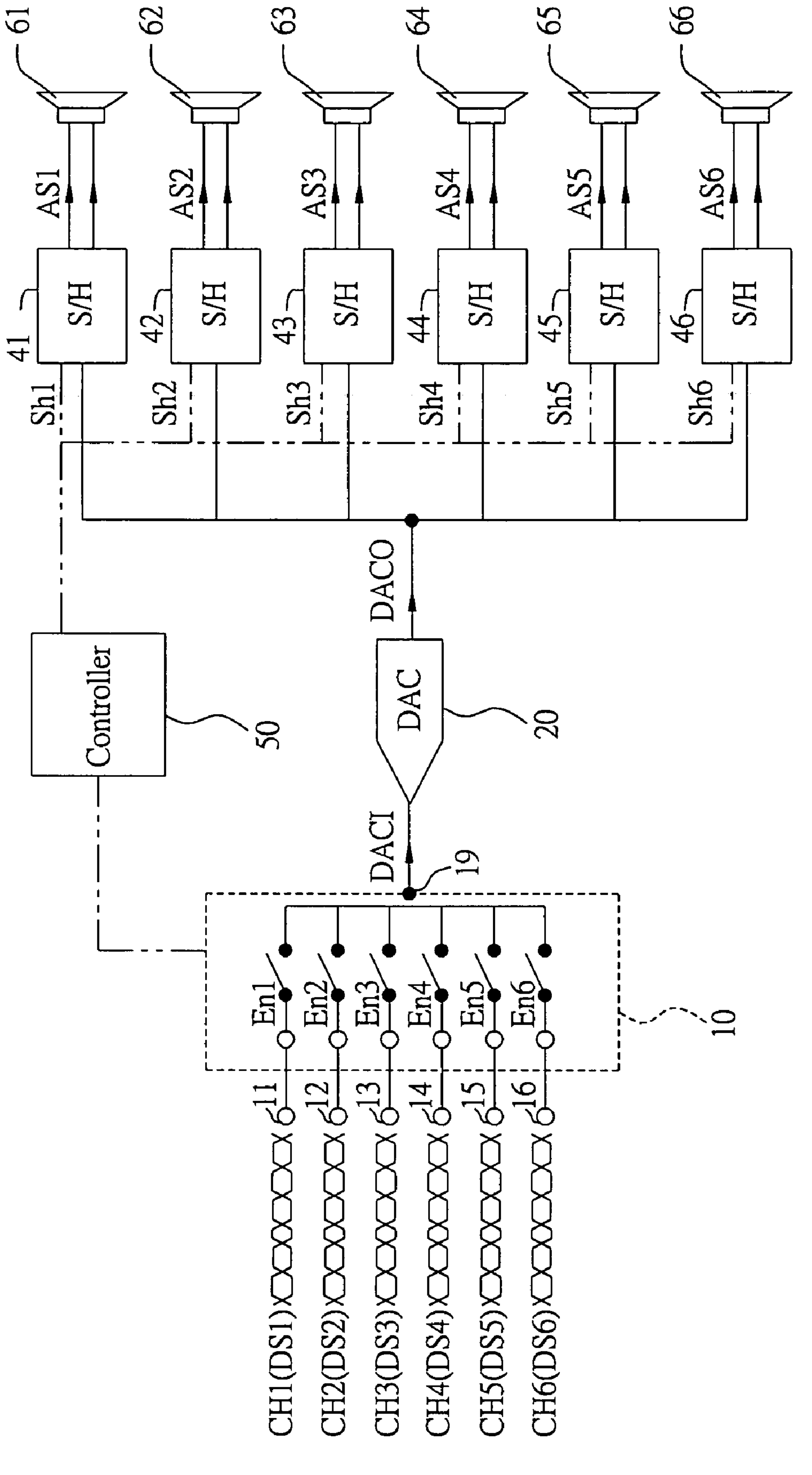
FIG. 4 is a schematic illustration showing an audio processing system for used in a multi-channel audio chip according to the second embodiment of the invention.

FIG. 4 is a schematic illustration showing an audio processing system for used in a multi-channel audio chip according to the second embodiment of the invention. Referring to FIG. 4, the audio processing system includes a multiplexer 10, a digital-to-analog converter (DAC) 20, six sample-and-hold (S/H) circuits 41 to 46 and a controller 50. The audio processing system receives and processes digital signals DS1 to DS6 from six channels CH1 to CH6, and then outputs audio sounds from six speakers 61 to 66.

The function and the operation of the multiplexer 10, DAC 20, S/H circuits 41 to 46, and controller 50 of the second embodiment shown in FIG. 4 are substantially the same with those of the first embodiment shown in FIG. 2 and detailed descriptions thereof will be omitted. The difference between the second and first embodiments is that the DAC 20 in the second embodiment is directly connected to the S/H circuits 41 to 46. The controller 50 generates sample/hold control signals Sh1 to Sh6 to control the S/H circuits 41 to 46 to sample and hold the analog signal DACO from the DAC 20 in a time-division manner. The timing control signals of Ph1 to Ph6 of FIG. 3 may be adopted as the sample/hold control signals Sh1 to Sh6 to control the sampling and holding time for the S/H circuits 41 to 46. According to this structure, the effects similar to the first embodiment also may be achieved.

To sum up, using the time-division manner as well as the sample-and-hold circuits, the invention may process digital audio signals from different channels and achieve multi-channel audio effects by utilizing only one DAC. Although the six-channel system is described as an example in the embodiments, this architecture of the invention also may be utilized in the systems with two, four, or even more than six channels.

Although the S/H circuits are needed in the embodiments of the present invention, one of ordinary skilled in the art may easily understand that the cost and the size of the DAC are far greater than those of the S/H circuit. Therefore, the cost and the size of the audio processing system of the present invention have been reduced. In addition, although the time-division method may theoretically cause the audio distortion, the level of distortion is so limited that it cannot be sensed by human being through the controlling of the multiplexer and de-multiplexer. Consequently, the present invention may achieve good audio effects.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An audio processing system for use in a multi-channel audio chip, the audio processing system comprising:

a multiplexer for receiving a plurality of digital signals and selectively outputting the digital signals in a time-division manner according to a first control signal;

a digital-to-analog converter for receiving the digital signals in the time-division manner and converting the digital signals into a plurality of analog signals, wherein each of the digital signals is corresponding to one of the analog signals;

a plurality of sample-and-hold circuits for selectively sampling the corresponding analog signals in the time-division manner and holding the corresponding analog signals for a predetermined period of time according to a second control signal, wherein each of the sample-and-hold circuits is corresponding to one of the analog signals;

a plurality of speakers for amplifying the analog signals and outputting the amplified analog signals, wherein each of the speakers is corresponding to one of the analog signals;

a controller for outputting the first and the second control signals to control operations of the multiplexer and the sample-and-hold circuits; and a de-multiplexer, coupled to the digital-to-analog converter, for receiving the corresponding analog signals and selectively outputting the corresponding analog signals to the sample-and-hold circuits in the time-division manner according to a third control signal.

2. The audio processing system according to claim 1, wherein the second control signal and the third control signal are substantially the same.

3. The audio processing system according to claim 1, wherein the predetermined period of time is determined by the second control signal.

4. An audio processing system for use in a multi-channel audio chip, the audio processing system comprising:

a multiplexer for receiving a plurality of digital signals and selectively outputting the digital signals in a time-division manner according to a first control signal;

a digital-to-analog converter for receiving the digital signals in the time-division manner and converting the digital signals into a plurality of analog signals, wherein each of the digital signals is corresponding to one of the analog signals;

a de-multiplexer, coupled to the digital-to-analog converter, for receiving the corresponding analog signals and selectively outputting the corresponding analog signals in the time-division manner according to a second control signal; and a plurality of sample-and-hold circuits, coupled to the de-multiplexer, for sampling and holding the corresponding analog signals for a predetermined period of time according to a third control signal.

5. The audio processing system according to claim 4, further comprising:

a plurality of speakers for amplifying the analog signals and outputting the amplified analog signals, wherein each of the speakers is corresponding to one of the analog signals.

6. The audio processing system according to claim 4, further comprising:

a controller for outputting at least one of the first, the second and the third control signals.

7. The audio processing system according to claim 4, wherein the second control signal and the third control signal are substantially the same.

8. The audio processing system according to claim 4, wherein the predetermined period of time is determined by the second control signal.

9. The audio processing system according to claim 4, wherein each of the sample-and-hold circuits is corresponding to one of the analog signals.

* * * * *